(12) United States Patent
Syu et al.

(10) Patent No.: US 9,105,245 B2
(45) Date of Patent: Aug. 11, 2015

(54) SPLICED LIQUID CRYSTAL DISPLAY (SLCD), METHOD FOR CHECKING THE SLCD, AND LCD DEVICE

(71) Applicant: SHENZHEN CHINA STAR OPTOELECTRONICS TECHNOLOGY CO., LTD, Shenzhen (CN)

(72) Inventors: Shensian Syu, Shenzhen (CN); Chunhuai Li, Shenzhen (CN)

( * ) Notice: Subject to any disclaimer, the term of this patent is extended or adjusted under 35 U.S.C. 154(b) by 112 days.

(21) Appl. No.: 13/824,351

(22) PCT Filed: Feb. 26, 2013

(86) PCT No.: PCT/CN2013/071896
§ 371 (c)(1),
(2) Date: Mar. 16, 2013

(87) PCT Pub. No.: WO2014/110856
PCT Pub. Date: Jul. 24, 2014

(65) Prior Publication Data
US 2014/0198020 A1    Jul. 17, 2014

(30) Foreign Application Priority Data
Jan. 16, 2013   (CN) .......................... 2013 1 0016365

(51) Int. Cl.
*G09G 5/00* (2006.01)
*G09G 3/36* (2006.01)

(52) U.S. Cl.
CPC ........ *G09G 3/3611* (2013.01); *G09G 2300/026* (2013.01); *G09G 2320/0233* (2013.01); *G09G 2320/0693* (2013.01)

(58) Field of Classification Search
CPC ... G06F 3/1423; G06F 3/1431; G06F 3/1446; G06F 3/147; G06F 3/015; G06F 19/3418; G06F 3/017; G06F 2203/04804; G06F 3/0481; G06F 3/04883; G06F 17/30778; G06F 19/3487; G06F 3/048; G06F 3/162; G06F 3/165; G06F 19/321; G06F 19/3406; G09G 2310/0235; G09G 2320/0693; G09G 3/2003; G09G 2320/0666; G09G 2320/0285; G09G 2360/144; G09G 3/3413; G09G 2300/0809; G09G 2330/021; G09G 5/02; G09G 2320/043; G09G 2320/0626; G09G 3/2022
USPC ..................... 345/1.1, 1.2, 1.3, 2.1
See application file for complete search history.

(56) References Cited

U.S. PATENT DOCUMENTS 6,271,825 B1 * 8/2001 Greene et al. ................. 345/694
6,804,406 B1 * 10/2004 Chen ............................ 382/254
(Continued)

FOREIGN PATENT DOCUMENTS

CN         1954352 A      4/2007
CN       101009852 A      8/2007
(Continued)

OTHER PUBLICATIONS

Chen Jiajia, the International Searching Authority written comments, Oct. 2013, CN.

*Primary Examiner* — Duc Dinh

(57) ABSTRACT

A spiked liquid crystal display (SLCD) includes a plurality of LCD devices. Each LCD device includes an LCD panel, and a drive circuit controlling a display of the LCD panel. The drive circuit includes an adjusting equipment storing a display parameter, and the display parameters of the adjusting equipments of at least two LCD devices of the plurality of LCD devices are different.

5 Claims, 4 Drawing Sheets

(56) References Cited

U.S. PATENT DOCUMENTS

| | | | |
|---|---|---|---|
| 8,174,626 B2 * | 5/2012 | Ouchi | 348/745 |
| 8,830,140 B2 * | 9/2014 | Lazzaro et al. | 345/1.1 |
| 8,830,148 B2 * | 9/2014 | Segawa et al. | 345/77 |
| 2001/0013843 A1 * | 8/2001 | Fujiwara et al. | 345/1.2 |
| 2003/0156073 A1 * | 8/2003 | Van Zon | 345/1.1 |
| 2008/0291189 A1 | 11/2008 | Song et al. | |
| 2010/0067788 A1 * | 3/2010 | Kondo et al. | 382/165 |
| 2012/0182485 A1 * | 7/2012 | Sawada et al. | 348/745 |

FOREIGN PATENT DOCUMENTS

| | | |
|---|---|---|
| CN | 101076128 A | 11/2007 |
| CN | 101447144 A | 6/2009 |
| CN | 102376294 A | 3/2012 |
| CN | 102801899 A | 11/2012 |
| CN | 203102819 U | 7/2013 |
| KR | 10-0906631 B1 | 7/2009 |

\* cited by examiner

SPLICED LIQUID CRYSTAL DISPLAY (SLCD), METHOD FOR CHECKING THE SLCD, AND LCD DEVICE

TECHNICAL FIELD

The present disclosure relates to the field of liquid crystal displays (LCDs), and more particularly to a spliced liquid crystal display (SLCD), a method for checking the SLCD, and an LCD device.

BACKGROUND

As shown in FIG. 1, a spliced liquid crystal display (SLCD) is divided into more than two LCD devices. If panels of the LCD devices have different display characteristics such as brightness, flicker, chroma, or the like under a same color, viewers may see discontinuous image at a splice of the panels. When manufacturing the panels, panel manufacturers need select light emitting diode (LED) lights of a same brightness and chroma to provide a backlight, and control stability in a process of manufacturing panels to reduce a difference between panels. The process is so complicated that difficulty in design is increased in addition to increasing cost.

SUMMARY

In view of the above-described technical problems, the aim of the present disclosure is to provide a spliced liquid crystal display (SLCD), a method for checking the SLCD, and an LCD device capable of reducing design difficulty and design cost.

The aim of the present disclosure is achieved by the following technical scheme.

A spliced liquid crystal display (SLCD) comprises a plurality of LCD devices. Each LCD device comprises an LCD panel, and a drive circuit controlling a display of the LCD panel. The drive circuit comprises an adjusting equipment storing a display parameter, and where the display parameters of the adjusting equipments of at least two LCD devices of the plurality of LCD devices are different.

Furthermore, the adjusting equipment comprises an interface module connected with an external debugging equipment, and the adjusting equipment reads the display parameter from the interface module and stores the display parameter. The display parameter in the technical scheme may be adjusted. Thus, unified debugging is performed after splicing a video-wall, and then the display parameters of all the LCD devices are correspondingly written. Even if there is a display effect deviation between LCD devices in a use process, the display effect deviation may be corrected by modifying the display parameter.

Furthermore, the display parameter comprises a gamma value and a chroma value, the drive circuit comprises a timing control chip controlling the display of the LCD panel, and the adjusting equipment comprises a programmable voltage buffer unit having an adjustable gamma value and a storage unit storing the chroma value, the programmable voltage buffer unit and storage unit are connected with the interface module. An output end of the storage unit is coupled with a chroma correction unit, and the chroma correction unit is integrated with the timing control chip. Output signals of the timing control chip and the programmable voltage buffer unit are coupled to the LCD panel. This is a specific structure of the drive circuit.

Furthermore, the display parameter comprises one or both of the gamma value and the chroma value, the adjusting equipment comprises one or both of the gamma correction unit having the adjustable gamma value and the chroma correction unit having the adjustable chroma value. By adjusting the gamma value, one or both of a brightness and a flicker of a display effect of the LCD panel may be adjusted. By adjusting the chroma value, the chroma of the display effect of the LCD panel may be adjusted.

A method for checking a display of a SLCD, the SLCD comprises at least two LCD devices. Each LCD device comprises an LCD panel, and a drive circuit controlling a display of the LCD panel. The drive circuit comprises an adjusting equipment storing a display parameter, and the adjusting equipment comprises an interface module connected with an external debugging equipment, the method comprises:

A: capturing a display image of one of the LCD devices by an optical sensing system, and extracting a display effect of the display image as a reference effect using the captured display image of the LCD device as a basis;

B: capturing the display effects of the display images of other LCD devices in sequence using the optical sensing system; and C: adjusting the display parameters of the other LCD devices to enable the display effects of compared images to be consistent with the reference effect.

Furthermore, in the step C, the optical sensing system writes a debugged display parameter into the adjusting equipment through the interface module. The display parameter in the technical scheme may be adjusted. Thus, unified debugging is performed after splicing a video-wall, and then the display parameters of all the LCD devices are correspondingly written. Even if there is a display effect deviation between LCD devices in a use process, the display effect deviation may be corrected by modifying the display parameters.

Furthermore, the display parameter comprises one or both of a gamma value and a chroma value. By adjusting the gamma value, one or both of a brightness and a flicker of the display effect of the LCD panel may be adjusted. By adjusting the chroma value, a chroma of the display effect of the LCD panel may be adjusted.

An LCD device comprises an LCD panel, and as drive circuit controlling a display of the LCD panel. The drive circuit comprises an adjusting equipment storing a display parameter, the adjusting equipment comprises an interface module connected with an external debugging equipment, and the display parameter of the adjusting equipment is adjustable.

Furthermore, the display parameter comprises one or both of a gamma value and a chroma value, the adjusting equipment comprises one or both of as gamma correction unit having an adjustable gamma value and a chroma correction unit having an adjustable chroma value. By adjusting the gamma value, one or both of a brightness and a flicker of the display effect of the LCD panel may be adjusted, by adjusting the chroma value, a chroma of the display effect of the LCD panel may be adjusted.

Furthermore, the display parameter comprises a gamma value and a chroma value, the drive circuit comprises a timing control chip controlling the display of the LCD panel, and the adjusting equipment comprises a programmable voltage buffer unit having an adjustable gamma value and to storage unit storing the chroma value, the programmable voltage buffer unit and the storage unit are connected with the interface module. An output end of the storage unit is coupled with a chroma correction unit, and the chroma correction unit is integrated with the timing control chip. Output signals of the timing control chip and the programmable voltage buffer unit are coupled to the LCD panel. The external debugging equipment writes the display parameters into the storage unit and the programmable voltage buffer unit by the interface module. This is a specific structure of the drive circuit.

In the present disclosure, because the adjusting equipment is arranged in the LCD device, and the adjusting equipment uses the display parameter corresponding to the display effect of the LCD panel, namely different display parameters correspond to different display effects, the LCD devices may be spliced as a video-wall as long as the display parameters of all the LCD devices are adjusted to enable the display effects of all the LCD panels to be consistent when displaying a same color. The present disclosure does not need to maintain the LCD devices of a same video-wall at a same height, thereby reducing device requirements, and reducing production cost. In addition, when a general optical sensing system is used to detect the display effect of each LCD panel, the display effect of one of the LCD panels of the same video-wall is used as a reference effect, and the display parameters of other LCD devices are adjusted by software adjustment, the display effect of other LCD panels may basically be a same as the reference display effect without performing a large number of hardware detection and debugging on all the LCD panels. Then, the LCD devices having proximate hardware quotas are used for a same SLCD, thereby reducing design difficulty and reducing development cycle.

DETAILED DESCRIPTION

Figure 1:
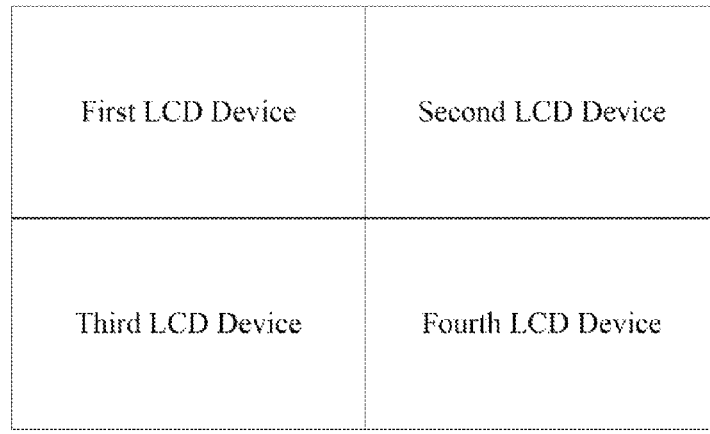
FIG. 1 is a schematic diagram of a spliced liquid crystal display (SLCD)
Figure 2:
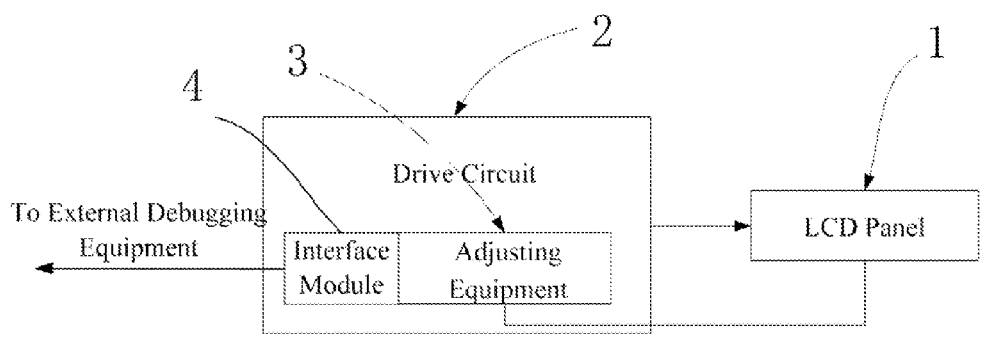
FIG. 2 is a schematic diagram of a liquid crystal display (LCD) device of the present disclosure.

The present disclosure provides a spliced liquid crystal display (SLCD), where the SLCD comprises an LCD device. As shown in FIG. 2, the LCD device comprises an LCD panel 1, and a timing control circuit board 2 (namely a drive circuit of the present disclosure) controlling a display of the LCD panel 1. The timing control circuit board 2 comprises an adjusting equipment 3 connected with an external debugging equipment and adjusting the display of the LCD panel 1. The adjusting equipment 3 uses a display parameter corresponding to a display effect of the LCD panel 1, where the display parameter of the adjusting equipment 3 is adjustable.

The SLCD comprises more than two LCD devices of the present disclosure, and the display parameters of the adjusting equipments 3 of at least two LCD devices are different.

In the present disclosure, because the adjusting equipment is arranged in the LCD device, and the adjusting equipment uses the display parameter corresponding to the display effect of the LCD panel, namely different display parameters correspond to different display effects, the LCD devices may be spliced as a video-wall as long as the display parameters of all the LCD devices are adjusted to enable the display effects of all the LCD panels to be consistent when displaying a same color. The present disclosure does not need to maintain the LCD devices of a same video-wall at a same height, thereby reducing device requirements, and reducing production cost. In addition, when a general optical sensing system is used to detect the display effect of each LCD panel, the display effect of one of the LCD panels of the same video-wall is used as a reference effect, and the display parameters of other LCD devices are adjusted by software adjustment, the display effect of other LCD panels ma basically be a same as the reference display effect without performing a large number of hardware detection and debugging on all the LCD panels. Then, the LCD devices having proximate hardware quotas are used for a same SLCD, thereby reducing design difficulty and reducing development cycle.

The present disclosure is further described in detail in accordance with the figures and the exemplary examples.

EXAMPLE 1

Figure 3:
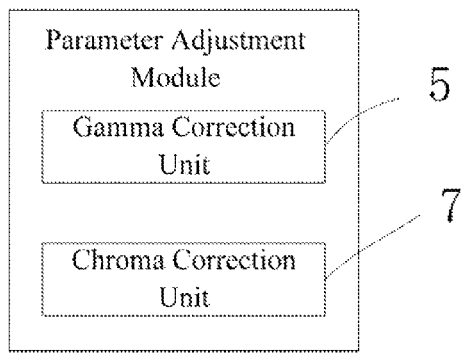
FIG. 3 is a schematic diagram of a first example of the present disclosure.

As shown in FIG. 3, the adjusting equipment 3 comprises a gamma correction unit 5 adjusting a gamma value of the LCD device, and a chroma correction unit 7 adjusting a chroma value of the LCD device. By adjusting the gamma value of the LCD device, one or both of a brightness and a flicker of the display effect of the LCD panel may be adjusted. By adjusting the chroma value of the LCD device, a chroma of the display effect of the LCD panel may be adjusted.

EXAMPLE 2

Figure 4:
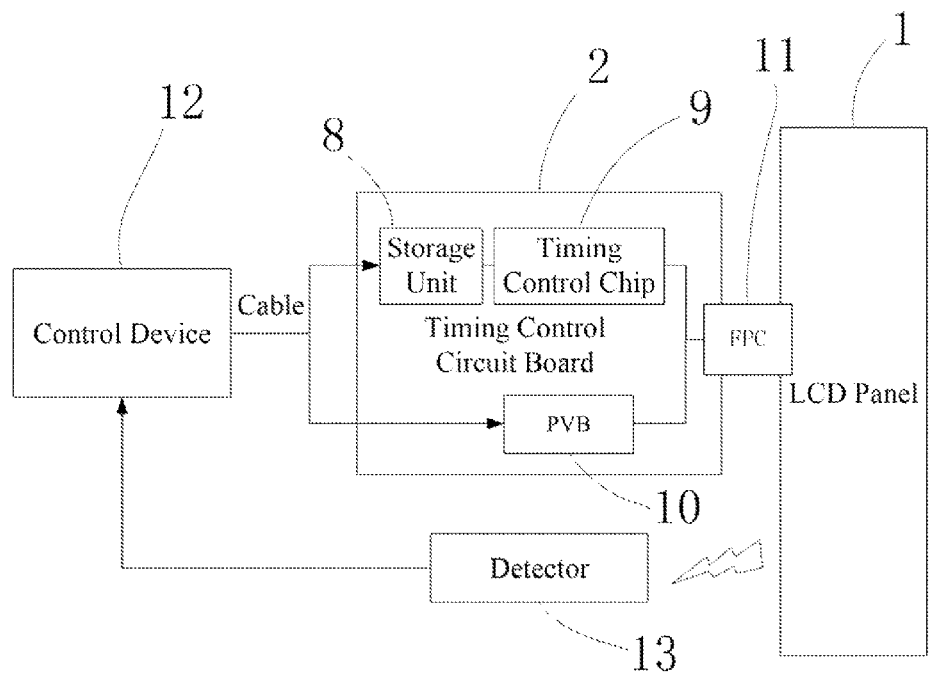
FIG. 4 is a schematic diagram of a second example of the present disclosure.
Figure 5:
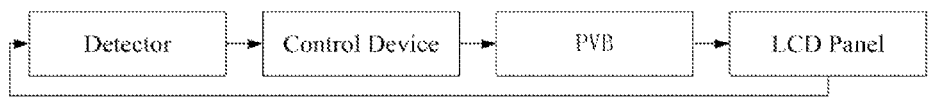
FIG. 5 is a schematic, diagram of a gamma correction method of a second example of the present disclosure.
Figure 6:
FIG. 6 is a schematic diagram of a chroma correction method of a second example of the present disclosure.

As shown in FIG. 4-FIG. 6, the timing control circuit board 2 comprises a timing control chip 9 controlling the display of the LCD panel 1, and the adjusting equipment further comprises a programmable voltage buffer unit 10 having an adjustable gamma value and a storage unit 8 storing a chroma value, the programmable voltage buffer unit 10 and the storage unit 8 are coupled with an interface module 4. The storage unit 8 transmits the chroma value to the timing control chip 9, and transmits the gamma value of the LCD device to the programmable voltage buffer unit 10. Output signals of the timing control chip 9 and the programmable voltage buffer unit 10 are coupled to the LCD panel 1 by a flexible circuit board 11. The external debugging equipment writes the display parameters to the storage unit 8 and the programmable voltage buffer unit 10 through the interface module 4.

A set of optical sensing system is used as the external debugging equipment. The sensing system comprises a detector 13 and a control device 12. The detector 13 captures a display image of the LCD panel 1 and transmits data of the display image to the control device 12, the control device 12 compares a display effect of the captured display image with a reference effect and then generates corresponding display parameters, and the control device 12 writes the chroma value of the display parameters into the storage unit 8 of the timing control circuit hoard 2 and writes the gamma value into the programmable voltage buffer unit 10.

EXAMPLE 3

Figure 7:
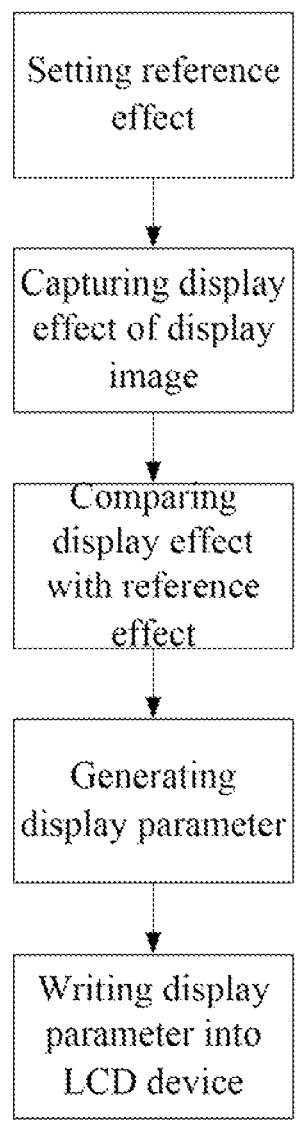
FIG. 7 is a schematic diagram of a third example of the present disclosure.

As shown in FIG. 7, the present disclosure further provides a method for checking a display of a SLCD. The SLCD comprises at least two LCD devices. The LCD devices comprise an LCD panel, and a timing control circuit board controlling a display of the LCD panel. The timing control circuit board comprises an adjusting equipment storing a display parameter, and the adjusting equipment comprises an interface module connected with an external debugging equipment. The method comprises:

A: capturing a display image of one of the LCD devices by an optical sensing system, and extracting a display effect of the display image as a reference effect of the SLCD using the captured display image of the LCD device as a basis;

B: capturing the display effects of the display images of other LCD devices in sequence using the optical sensing system; and C: adjusting the display parameters of the other LCD devices to enable the display effects of compared images to be consistent with the reference effect.

The step A comprises: capturing the display image of one of the LCD devices by a detector of the optical sensing system, and extracting the display effect of the display image as the reference effect by using the captured display image of the LCD device as a basis.

The step B comprises: capturing the display effects of the display images of other LCD devices in sequence using the detector the optical sensing system.

The step C comprises: a control system of the optical sensing system generating a corresponding display parameter by comparing a difference between the display effect of the display image of other LCD devices and the reference effect, writing a chroma value of the display parameter into a storage unit of the timing control circuit board, and writing a gamma value into a programmable voltage buffer unit. The LCD device adjusts an output image of the LCD panel according to the stored display parameters to enable the display effect of other LCD panels to be consistent with the reference effect.

The optical sensing system writes the debugged display parameters into the adjusting equipment through the interface module. The display parameters may be adjusted. Thus, unified debugging is performed after splicing a video-wall, and then the display parameters of all the LCD devices are correspondingly written. Even if there is a display effect deviation between LCD devices in a use process, the display effect deviation may be corrected by modifying the display parameters.

The display parameter comprises one or both of the gamma value and the chroma value. By adjusting the gamma value, one or both of a brightness and a flicker of the display effect of the LCD panel may be adjusted. By adjusting the chroma value, a chroma of the display effect of the LCD panel may be adjusted.

The present disclosure is described, in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

The invention claimed is:

1. A spliced liquid crystal display (SLCD), comprising:
a plurality of LCD devices;
wherein each LCD device comprises an LCD panel, and a drive circuit controlling a display of the LCD panel; the drive circuit comprises an adjusting equipment storing a display parameter, wherein the display parameters of the adjusting equipments of at least two LCD devices of the plurality of LCD devices are different; and
wherein the adjusting equipment comprises an interface module connected with an external debugging equipment, and the adjusting equipment reads the display parameter from the interface module and stores the display parameter;
wherein the display parameter comprises a gamma value and a chroma value, the drive circuit comprises a timing control chip controlling display of the LCD panel, and the adjusting equipment comprises a programmable voltage buffer unit having an adjustable gamma value and a storage unit storing the chroma value, the programmable voltage buffer unit and the storage unit are connected with the interface module; an output end of the storage unit is coupled with a chroma correction unit, and the chroma correction unit is integrated with the timing control chip; output signals of the timing control chip and the programmable voltage buffer unit are coupled to the LCD panel.

2. A method for checking a display of a spliced liquid crystal display (SLCD), wherein the SLCD comprises at least two LCD devices; each LCD device comprises an LCD panel, and a drive circuit controlling a display of the LCD panel; the drive circuit comprises an adjusting equipment storing a display parameter, and the adjusting equipment comprises an interface module connected with an external debugging equipment; the method comprising:
A: capturing a display image of one of the LCD devices by an optical sensing system, and extracting a display effect of the display image as a reference effect using the captured display image of the LCD device as a basis;
B: capturing the display effects of the display images of other LCD devices in sequence using the optical sensing system; and
C: generating a corresponding display parameter by comparing a difference between the display effect(s) of the display image of the other LCD devices and the reference effect, writing the generated display parameter into the other LCD devices to enable the display effects of the other LCD devices to be consistent with the reference effect.

3. The method for checking the display of the spliced liquid crystal display (SLCD) of claim 2, wherein in the step C, the optical sensing system writes a debugged display parameter into the adjusting equipment through the interface module.

4. The method for checking the display of the spliced liquid crystal display (SLCD) of claim 2, wherein the display parameter comprises one or both of a gamma value and a chroma value.

5. A liquid crystal display (LCD) device, comprising:
an LCD panel; and
a drive circuit controlling a display of the LCD panel;
wherein the drive circuit comprises an adjusting equipment storing a display parameter; the adjusting equipment comprises an interface module connected with an external debugging equipment, and the display parameter of the adjusting equipment is adjustable; and
wherein the display parameter comprises a gamma value and a chroma value, the drive circuit comprises a timing control chip controlling the display of the LCD panel, and the adjusting equipment comprises a programmable voltage buffer unit having an adjustable gamma value and a storage unit storing the chroma value, the programmable voltage buffer unit and the storage unit are connected with the interface module; an output end of the storage unit is coupled with a chroma correction unit, and the chroma correction unit is integrated with the timing control chip; output signals of the timing control chip and the programmable voltage buffer unit are coupled to the LCD panel; the external debugging equipment writes the display parameters into the storage unit and the programmable voltage buffer unit through the interface module.

\* \* \* \* \*